United States Patent

[11] 3,621,060

[72] Inventor Terry G. Selin
Schenectady, N.Y.
[21] Appl. No. 788,936
[22] Filed Jan. 3, 1969
[45] Patented Nov. 16, 1971
[73] Assignee General Electric Company

[54] PROCESS FOR PREPARATION OF ENAMINES FROM HYDROCARBYLSILANES
8 Claims, No Drawings

[52] U.S. Cl. .................................................. 260/563 R,
260/448.2 E, 260/482 R, 260/570.8 R, 260/583 H,
260/584 A
[51] Int. Cl. ..................................................... C07c 85/08,
C07f 7/08

[50] Field of Search ............................................ 260/563,
584 A, 583 H, 570.8, 448.2 E

[56] References Cited
FOREIGN PATENTS
472,362   1969   Switzerland ..................   260/563

Primary Examiner—Charles B. Parker
Assistant Examiner—D. R. Phillips
Attorneys—Donavon L. Favre, Frank L. Neuhauser and Oscar B. Waddell ABSTRACT: A ketonic hydrocarbon is converted to an enamine by heating a mixture of the ketonic hydrocarbon with an organosilane having at least one dialkylamino group directly attached to the silicon. In the reaction, the organosilicon is converted to a organopolysiloxane.

PROCESS FOR PREPARATION OF ENAMINES FROM HYDROCARBYLSILANES

BACKGROUND OF THE INVENTION

Processes are known to the prior art for forming enamines. However, these prior art processes generate water as a byproduct, an obvious disadvantage in the preparation of moisture-sensitive enamines.

Further, enamines derived from low-boiling amines, according to the processes of the prior art, amines high-pressure conditions.

None of the prior art processes allow the preparation of enamines derived from low-boiling amines at atmospheric pressure, nor could enamines which were water sensitive be prepared, effectively, by prior art processes.

SUMMARY OF THE INVENTION

In accordance with the present invention a ketonic hydrocarbon is reacted with a monomeric organosilicon compound having a dialkylamino group directly attached to the silicon, in the presence of heat. In the course of the reaction, the organosilicon compound is converted to an organopolysiloxane. The overall reaction can be generically represented:

(1)
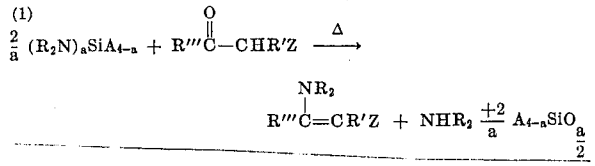

where R is an alkyl radical of from one to three carbon atoms; R' is selected from the class consisting of hydrogen, carbonyl methylene, and —CHR'', where R'' is a monovalent hydrocarbon group of not more than 18 carbon atoms selected from the class consisting of alkyl, aryl, and alkenyl; R''' and A are each monovalent hydrocarbon radicals of not more than 18 carbon atoms; Z is selected from the class consisting of hydrogen, when R' is hydrogen, a monovalent hydrocarbon radical of not more than 18 carbon atoms, and, in combination with R''', an alkylene radical of not more than 12 carbon atoms; and $a$ is from 1 to 2.

In carrying out the reaction, the two reactants are placed in a reaction vessel and heated at the reflux temperature of the mixture until the byproduct dialkylamine distills off. The remaining reaction mixture is then fractionally distilled to recover both the enamine and, when $a$ is 1, the hexaalkyldisiloxane. In some cases, the diorganopolysiloxane may also be recovered by this fractional distillation.

Thus, the reaction serves, not only, to convert the ketonic hydrocarbon to an enamine, but additionally converts the dialkylamine substituted monomeric organosilicon compound to an organopolysiloxane.

DESCRIPTION OF THE PREFERRED EMBODIMENTS

As indicated, the ketonic hydrocarbon of formula:

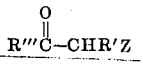

is converted to an enamine of formula:

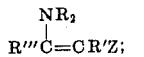

by reacting the ketonic hydrocarbon with a monomeric organosilicon compound having a dialkylamino substituent, of formula:

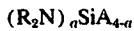

Among the radicals represented by R in the formulas above are methyl, ethyl, propyl, and isopropyl.

In addition to the carbonyl, methylene, and hydrogen substituents represented by R', the substituted methylene, can include such substituents as methyl, ethyl, propyl, butyl, octyl, dodecyl, isopropyl, isobutyl, etc.; cycloalkyl radicals, such as, cyclohexyl, cyclopentyl, cycloheptyl, etc.; aryl radicals, such as, phenyl, biphenyl, naphthyl, benzoylphenyl, paraphenoxyphenyl, tolyl, xylyl, etc.; aralkyl radicals, such as, benzyl, phenethyl, etc.; and alkenyl radicals, such as vinyl, allyl, etc. The hydrocarbon radicals represented by R''' and Z are, essentially, the alkyl, aryl, and aralkyl radicals described for R'. Further, as indicated, R''' and Z can combine to form an alkylene bridge, such as, ethylene, propylene, butylene, etc., so as to form a cyclic ketonic hydrocarbon. Additionally, the monovalent hydrocarbon radicals represented by A are essentially those alkyl, aryl, and aralkyl radicals described for R'.

As a dialkylamine is produced as a byproduct in the production of enamine, 2-mole equivalents of dialkylamine substituents on the organosilicon compound are required for each mole of the ketonic hydrocarbon to be reacted, as indicated in equation (1.). Thus, if the organosilicon compound is substituted with a single dialkylamino group, then 2 moles of the monomeric organosilane are required for each mole of the ketonic hydrocarbon, and the resulting products are a single mole of the enamine and 1 mole of a hexahydrocarbondisiloxane. When the monomeric organosilicon compound is distributed with the dialkylamino group, then the reaction between the monomeric organosilicon compound and the ketonic hydrocarbon requires 1 mole of each and the resulting product is a single mole of the enamine and a diorganopolysiloxane, which may be cyclic or may be a long chain polymer.

The reaction is preferably carried out with the stoichiometrically required amounts of the two reactants, though a large excess of the dialkylamino substituted organosilane can be employed as, for example, from 10 to 200 percent.

The reaction is carried out at the reflux temperature of the reaction mixtures which is generally from about 70° to 200 ° C. During the course of the reaction, which requires 1 to 6, or more, hours, the byproduct dialkylamine rapidly distills from the reaction mixture in the early portion of the heating and the result is a slight lowering of the reaction temperature. Following completion of the reaction, and completion of the evolution of the dialkylamine byproduct, the temperature of the refluxing reaction mixture rises again and the reaction mixture is then fractionally distilled.

Depending upon the organopolysiloxane formed in the course of the reaction, it may be removed by fractional distillation. The enamine which is produced according to the reaction is recovered from the reaction mixture by fractional distillation with yields of as much as 90 percent and more.

With certain of the enamines produced according to the process of the present invention, instead of, or in addition to, fractional distillation, the products may be allowed to crystallize and recover by filtration. The resulting crystals can then be purified by recrystallization from hydrocarbon solvents, such as, pentane, hexane, etc.

The method of preparing the enamines, according to the present invention will now be described in greater detail, in the following examples. These examples should be considered as illustrative only, and not as limiting in any way the full scope of the invention as covered in the appended claims. All parts in the following examples are by weight.

EXAMPLE 1

A reaction vessel was equipped with a reflux condenser, thermometer, and magnetic stirrer. A quantity of 50 parts of dimethylaminotrimethylsilane and 16.8 parts of cyclopentanone was charged to the vessel and the resulting mixture was stirred and heated. The evolution of the byproduct dimethylamine became rapid at about 74° C. and cooled the temperature of the reaction mixture to 56° C. Heating was continued until the reaction temperature reached a maximum of 106° C., at which point evolution of dimethylamine ceased.

This required approximately 90 minutes from the start of dimethylamine evolution. The reaction mixture was fractionally distilled yielding 20.3 parts, 91.5 percent of the theoretical percentage expected, of dimethylaminocyclopentene-1 of formula:

(2)   N(CH₃)₂

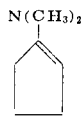

This product was recovered at 42°–44° C. at 43 mm. pressure. The refractive index, $n_D^{25}$, was 1.4774.

EXAMPLE 2

The reaction described in example 1 was repeated, but employing 19.6 parts of cyclohexanone, in combination with the dimethylaminotrimethylsilane. The initial reaction temperature in this enamine production was approximately 80° C., which then dropped to 45°–50° C., during the dimethylamine evolution. After the amine evolution had ceased, the temperature rose rapidly to about 110° C. The product dimethylaminocyclohexene-1, of formula:

(3)   N(CH₃)₂

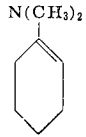

was obtained at a temperature of 71°–73° C. and a pressure of 38 mm., in a yield of 97.6 percent of the theoretically expected amount. The refractive index, $n_D^{25}$, of the product of formula (3) was 1.4863.

EXAMPLE 3

The reaction of example 1 was repeated employing a quantity of 25.6 parts of 2-octanone, in place of the cyclopentanone. The evolution of dimethylamine, in this reaction, commenced at about 85° C. and the temperature of the reaction mixture rose to approximately 100° C. over a period of 45 minutes. Continued heating at about 115° C. resulted in continuing evolution of dimethylamine. Evolution of the amine required approximately 12 hours. When the evolution of dimethylamine ceased, the product having the formula:

(4)    N(CH₃)₂
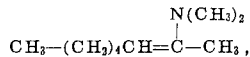
CH₃—(CH₂)₄CH=C—CH₃ , was recovered in a yield of approximately 69 percent.

EXAMPLE 4

In a manner similar to that described in example 1, a quantity of 10 parts of 2,4-pentanedione was reacted with 50 parts dimethylaminotrimethylsilane. There was a smooth evolution of dimethylamine from the refluxing reaction mixture and, when the reaction mixture was allowed to cool, the desired product:

(5)     O      N(CH₃)₂
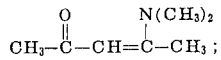
CH₃—C—CH=C—CH₃ ;

precipitated from the solution. The crystals which formed were recovered by suction filtration and were purified by recrystallization, once, from warm hexane. The material had a melting point of 47°–48° C. and was recovered in a yield of 85 percent of the amount theoretically expected.

EXAMPLE 5

A quantity of 9.8 parts of cyclohexanone and 14.6 parts of bis-(dimethylamino)dimethylsilane were placed into a reaction vessel as described for example 1. The resulting mixture was heated at reflux and, after about 4 hours, the reaction mixture temperature had risen to approximately 166° C. The temperature remained constant at this point, indicating completion of the reaction. The reaction mixture was fractionally distilled to yield 11.4 parts of dimethylaminocyclohexene-1, having the same formula as indicated in formula (3). The material was recovered at a boiling point of 71°–73 C. and a pressure of 38 mm. As in example 2, the refractive index, $n_D^{25}$, was 1.4863. The other products recovered from the distillation included hexamethylcyclotrisiloxane and a long chain dimethylpolysiloxane.

EXAMPLE 6

In the same manner as in example 1, a quantity of 11.6 parts of acetone and 50 parts of dimethylaminotrimethylsilane were reacted at a reflux temperature of 61° C. During evolution of the dimethylamine, the temperature dropped to 56° C. but, after about 6 hours, rose to 89° C. The resulting product had the formula:

(6)         N(CH₃)₂
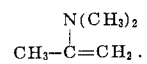
        CH₃—C=CH₂ .

EXAMPLE 7

In the same manner as in example 1, a quantity of 16.2 parts benzoylacetone were reacted with 35 parts of dimethylaminotrimethylsilane. The reflux temperature of the exothermic reaction mixture rose from 73° C. to approximately 98° C. in 1 hour. Upon standing for 1 hour, without heating, a product crystallized from the reaction mixture and was found to be a mixture of:

(7)        N(CH₃)₂  O
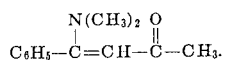
       C₆H₅—C=CH—C—CH₃ .

and (8)          O     N(CH₃)₂
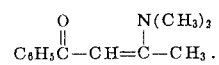
         C₆H₅C—CH=C—CH₃ .

EXAMPLE 8

In the same manner as in example 1, 22.4 parts of dibenzoylmethane were reacted with 35 parts of dimethylaminotrimethylsilane. The reaction was essentially complete after 1 hour, but refluxing was continued at the maximum reflux temperature of 95° C. for approximately 9 hours. A fractional distillation yielded a clear, viscous oil, the infrared spectrum of which was consistent with the structure.

(7)        N(CH₃)₂  O
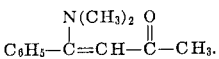
       C₆H₅—C=CH—C—CH₃ .

EXAMPLE 9

In the same manner as in example 1, a quantity of 26 parts of the ethyl ester of acetoacetic acid and 38.6 parts of ethylmethylaminodimethylphenylsilane were reacted at reflux. Following evolution of the ethylmethylamine, the product:

(9)       (C₂H₅)N(CH₃)  O
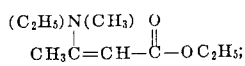
          CH₃C=CH—C—OC₂H₅;

was recovered by recrystallization.

Thus, a versatile method for the preparation of enamines has been shown. Such materials are useful, for example, as intermediates in the alpha-alkylation or acylation of aldehydes and ketones. Additionally, as can be seen, enolizable ketonic hydrocarbons can be employed for the polymerization of organosilanes having at least one dialkylamino group.

I claim:

1. A method for forming an enamine from a ketonic hydrocarbon comprising reacting 1 mole of a ketonic hydrocarbon of the formula:

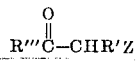

with 2/a moles of an organosilane of the formula;

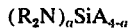

at a temperature in the range of from about 70° to 200° C. where R is a monovalent alkyl group of from one to three carbon atoms; R' is selected from the class consisting of carbonyl, methylene, hydrogen and —CHR'', where R'' is a monovalent hydrocarbon radical of not more than 18 carbon atoms selected from the class consisting of alkyl, aryl and alkenyl; R''' and A are monovalent hydrocarbon radicals of not more than 18 carbon atoms; Z is selected from the class consisting of hydrogen, when R' is hydrogen, hydrocarbon and, in combination with R''', an alkylene radical of not more than 12 carbon atoms to form a cyclic ketonic hydrocarbon; and $a$ is from one to two.

2. The method of claim 1 wherein the organosilane is dimethylaminotrimethylsilane.

3. The method of claim 1 wherein the organosilane is bis-(dimethylamino)dimethylsilane.

4. The method of claim 1 wherein the ketonic hydrocarbon is a cyclic ketone.

5. The method of claim 1 wherein the ketonic hydrocarbon is a diketone.

6. A method for forming dimethylaminocyclopentene-1, comprising heating, at reflux, a mixture of dimethylaminotrimethylsilane and cyclopentanone.

7. The method for forming 4-dimethylamino-3-pentene-2-one, comprising heating, at reflux, a mixture of 2,4-pentanedione with dimethylaminotrimethylsilane.

8. A method for forming dimethylaminocyclohexene-1, comprising, heating, at reflux, a mixture of cyclohexanone and bis-(dimethylamino)dimethylsilane.

* * * * *